United States Patent [19]
Barkhurst

[11] 3,731,565
[45] May 8, 1973

[54] TOOLHOLDER
[75] Inventor: Ernest F. Barkhurst, Euclid, Ohio
[73] Assignee: Acme-Cleveland Corporation, Cleveland, Ohio
[22] Filed: Aug. 31, 1970
[21] Appl. No.: 68,109

[52] U.S. Cl. ................................82/34 R, 82/36 R
[51] Int. Cl. .............................................B23b 25/06
[58] Field of Search ......................82/34 R, 24, 36 R

[56] References Cited

UNITED STATES PATENTS

| | | | |
|---|---|---|---|
| 3,668,954 | 6/1972 | Brown | 82/36 R |
| 2,875,662 | 3/1959 | Poorman | 82/36 R |
| 2,188,917 | 2/1940 | Poorman | 82/36 R |
| 3,604,293 | 9/1971 | Foll et al. | 82/24 |
| 3,566,723 | 3/1971 | Oborne | 82/34 |
| 3,380,326 | 4/1968 | Waddy | 82/34 |
| 3,141,366 | 7/1964 | Frank | 82/34 X |
| 2,540,289 | 2/1951 | Randall | 82/34 X |

Primary Examiner—Leonidas Vlachos
Attorney—Woodling, Krost, Granger and Rust

[57] ABSTRACT

A standard toolholder is disclosed to be mounted on any one of the several cross-slides of an automatic screw machine having uniform distance between the slide mounting surface and the cutting plane parallel thereto. The toolholder assembly includes a holder base receiving a cylindrical shank of a tool-holder on the front of which is mounted any one of a variety of tools, such as dovetail, circular, flat, cut-off, shaving, knurling, burnishing, stenciling, single roll threading, recessing and boring tools. Such toolholder assembly provides standardized mounting heights for all such types of tools and provides for straight or off-set mounting of the toolholder relative to a perpendicular or in line to the spindle axis. The foregoing abstract is merely a resume of one general application, is not a complete discussion of all principles of operation or applications, and is not to be construed as a limitation on the scope of the claimed subject matter.

21 Claims, 15 Drawing Figures

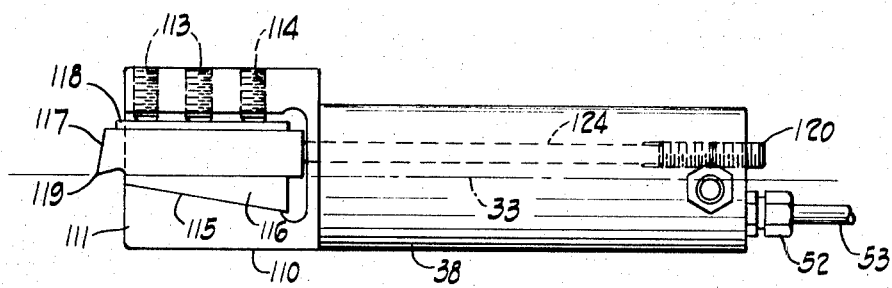
Fig. 9
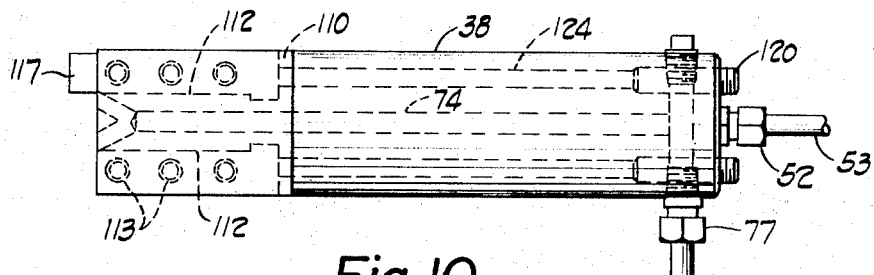
Fig. 10
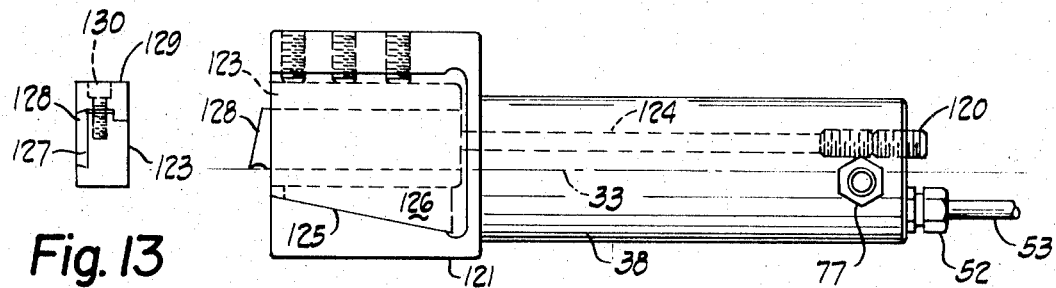
Fig. 13  Fig. 11
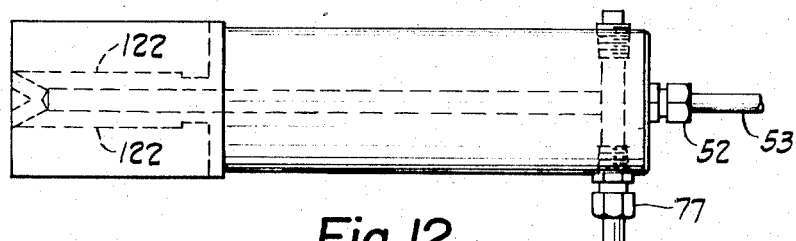
Fig. 12
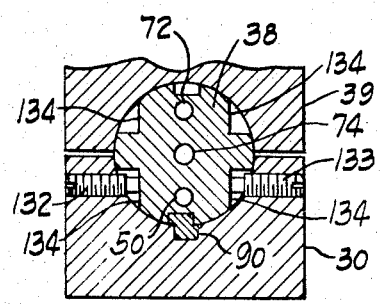
Fig. 14
Fig. 15
INVENTOR.
ERNEST F. BARKHURST
BY Woodling, Krost,
Granger and Rust
ATTORNEYS.

TOOLHOLDER

BACKGROUND OF THE INVENTION

On multiple spindle automatic screw machines it has been customary to provide a central end tool slide carrying non-rotating and rotating tools which cooperate with the end of workpieces carried in the rotating spindles in an indexible spindle carrier. Each time the spindle carrier indexes the tools are successively brought to bear against the workpieces to progressively shape them from the blank, either bar or chucked parts, to the finished workpiece. Also in such automatic screw machines it has been customary to provide cross-slides carrying tools movable in a path perpendicular to the spindles at the respective spindle positions. Whereas there has previously been used tool-holders with cylindrical shanks mounted on the end tool slides of such automatic screw machines, it has not heretofore been customary to use toolholders with cylindrical shanks on the cross-slides. The modern automatic screw machine is a highly complex machine tool with a multitude of machine parts compactly arranged around the spindle carrier in order to be able to perform cutting tool work on the workpieces carried in the spindles. Accordingly, the cross-slides have customarily been mounted wherever there was room and it has not been customary to provide uniform mounting height between the mounting surface of a particular cross-slide and the cutting plane parallel thereto of the movable tool carried on such cross-slide. Accordingly, it has been customary to provide toolholder mounting means which were especially adapted to each particular cross-slide position. Further there is a right side and a left side to the machine and for counterclockwise rotation of the spindles as one views the face of the head stock containing the spindles, the cross-slide tools moving in from the left side of the head stock are mounted right-side-up for up-cutting. Conversely, the tools mounted on the right side of the face of the head stock are mounted upside-down for down cutting. For a six spindle machine with six cross-slides, this frequently meant that six different mounting height dimensions and right and left toolholder mountings were required for the six cross-slides.

With the current emphasis on preset tooling, it has been desired to have an extra set of toolholders which can be preset in a gauge and then moved to the machine tool so that the down time between production runs will be minimized. This has necessitated a great number of toolholder mountings many of which are especially made for a particular cross-slide and which cannot be universally used at each of the cross-slides of the automatic screw machine.

Additionally, there are four general types of tool-holders, circular, dovetail, flat and cut-off, with each formerly having a different mounting thereof to a cross-slide. With a full range of sizes of machines for both bar and chucking machines, this could be as many as 500 different toolholders required for a complete inventory, for the different sizes of machines, the different tools, the different slide positions on each machine tool, the right and left sides of the head stock base and the different requirements for straight or off-set cutting relative to a perpendicular to the spindle axis.

Accordingly, an object of the invention is to provide a universal standard toolholder for a machine tool.

Another object of the invention is to provide a standard toolholder with a uniform mounting height between the mounting surface and the cutting plane.

Another object of the invention is to provide a toolholder with a minimum of ground surfaces yet which has a maximum flexibility in mounting different types of tools.

Another object of the invention is to provide a cylindrical shank toolholder with provisions for presetting a gauge distance of the tool and provisions for coolant flow to the tool.

Another object of the invention is to provide a toolholder assembly which may readily be changed from a position perpendicular to the spindle axis or off-set to the perpendicular.

Another object of the invention is to provide a toolholder assembly with first and second gauge means incorporated therein to preset the position of the tool in two directions in the cutting plane.

SUMMARY OF THE INVENTION

The invention may be incorporated in a toolholder assembly for a machine tool having a spindle with an axis and a slide movable relative to said axis and with a mounting surface, said toolholder assembly including, in combination, a holder base, means to secure said holder base to the slide mounting surface, said holder base having a cylindrical bore with an axis in a reference plane passing through the axis of the spindle and parallel to the slide mounting surface, a cylindrical shank tool holder fitting within said cylindrical first bore and having a forward and a rearward end, tool mounting means unitary with said forward end of said tool holder shank to hold a tool for operating on a workpiece in the spindle, a first keyway in said holder base, a second keyway in said cylindrical shank, and key means acting between said keyways to establish a tool in said mounting means perpendicular to or offset to the axis of the spindle.

BRIEF DESCRIPTION OF THE DRAWING

FIG. 9 is a side elevational view of a flat tool-holder;

FIG. 10 is a top view of the toolholder of FIG. 9;

FIG. 11 is a side elevational view of a cut-off toolholder;

FIG. 12 is a top view of the toolholder of FIG. 11;

FIG. 13 is an end view of the cut-off tool insert;

FIG. 14 is a cross-sectional view of the toolholder shank and an offset key; and FIG. 15 is a side elevation of the offset key.

DESCRIPTION OF THE PREFERRED EMBODIMENT

Figure 1:
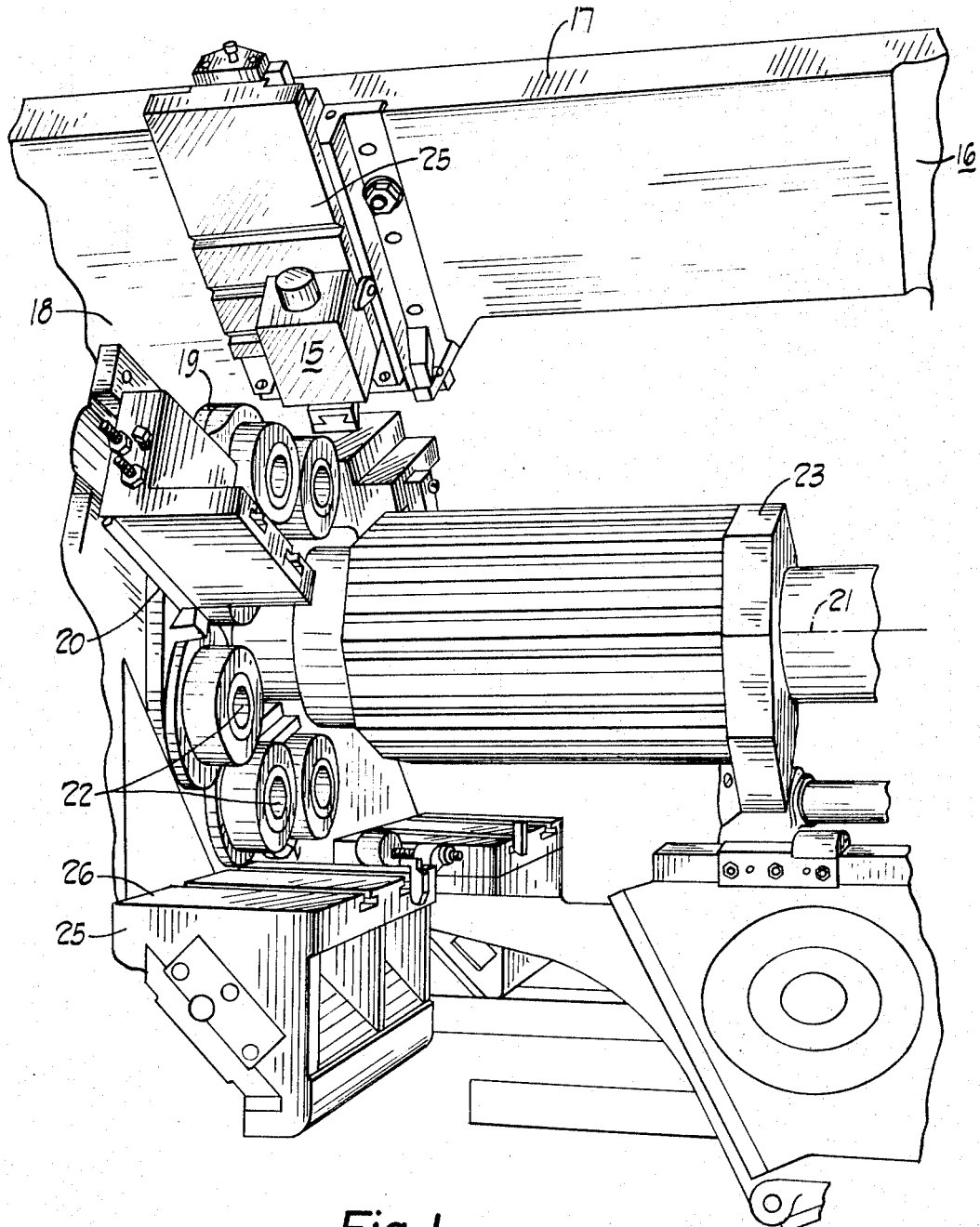
FIG. 1 is a perspective view of a machine tool having cross-slides to receive toolholders in accordance with the present invention.

The figures of the drawing show the preferred embodiment of the invention which is a toolholder assembly 15 for use with a machine tool 16 such as the multiple spindle automatic screw machine type. This machine tool 16 has a frame 17 with a head stock 18 journalling an indexible spindle carrier 19. The front of the spindle carrier 19 is exposed at the face 20 of the head stock 18. The spindle carrier 19 indexes about a main machine tool axis 21 and carries a plurality of rotatable spindles 22. There may be 4, 6 or 8 such spindles and in this case an eight spindle machine is shown. An end tool slide 23 reciprocates along the axis 21 and carries end working tools on a polygonal face for working on the ends of workpieces carried in the spindles 22. These end working tools and workpieces are not shown in FIG. 1 in order to clarify the drawing. A plurality of cross-slides 25 in this case shown as six in number are provided for carrying tools to work on the workpieces in the spindles at the respective spindle positions of the spindle carrier 19. In this machine tool shown, two are tow upper cross-slides, two upper side slides and two lower cross-slides. Each of these six slides may carry a toolholder assembly 15. Each of the cross-slides 25 has a mounting surface 26 designed to mount the toolholder assembly 15.

Figure 2:
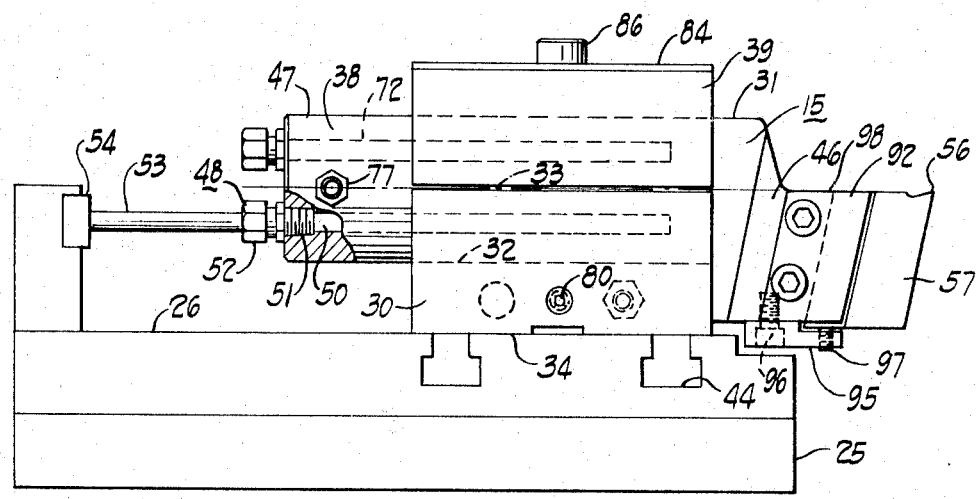
FIG. 2 is a side elevational view of a machine tool slide and toolholder assembly.
Figure 3:
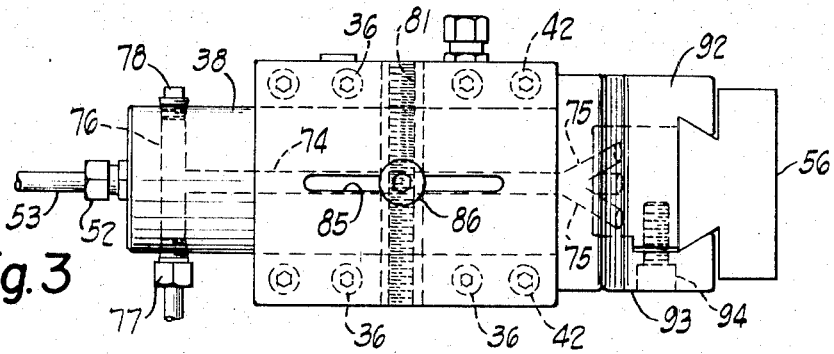
FIG. 3 is a top view of the toolholder assembly of FIG. 2.

FIG. 2 better shows the toolholder assembly 15 as including generally a holder base 30 supporting a toolholder 31. The holder base 30 has a surface 32 defining a cylindrical bore with an axis 33 in the cutting plane or reference plane and which is parallel to the mounting surface 26. The holder base 30 has a mounting surface 34 which may be a ground surface and receivable on the mounting surface 26 of the slide. The holder base 30 has at least one longitudinal slot 35 parallel to the axis 33 with tool-holder clamping screws 36 extending across the slot and engaging the upper part and the lower part of the holder base 30 to draw this holder base together and clamp it on the cylindrical shank 38 of the toolholder 31. In this preferred embodiment the upper part 39 of the holder base 30 is made separable as a cap 39 by having a second longitudinal slot 40 between this cap 39 and the lower part of the holder base 30. Clamping screws 36 engage this cap 39 and the lower part of holder base 30 on both sides of the axis 33.

Hold down bolts 42 extend through the lower part of the holder base 30 and engage T-nuts 43 disposed in T-slots 44 in the mounting surface 26 of the slides 25. These T-slots 44 extend in planes perpendicular to the shank axis 33.

The toolholder 31 includes the cylindrical shank 38 which may be a ground surface and this shank has a forward end on which tool mounting means 46 is provided unitary with the shank. The shank 38 has a rear end 47 on which first gauge means 48 is provided. The first gauge means 48 includes a gauge bore 50 in the shank 38 parallel to the axis 33 but off-set therefrom. The outer end of this gauge bore 50 is threaded at 51 to receive a compression friction fitting 52. A first gauge rod 53 is securable in the compression fitting 52 to any adjustable length. As shown in FIG. 2, it may be adjusted to abut a first gauge block 54 fixed on the rear of the slide 25, or fixed in one of the T-slots 44. In this manner a cutting tip 56 of a cutting tool 57 may be preset in a gauge to a predetermined gauge length of this toolholder assembly 15. Accordingly the cap 39 may be removed from the lower part of the base 30, the toolholder 31 set in place with the preset first gauge rod 53 abutting the gauge block 54 and this will establish the cutting tip 56 at the proper predetermined distance. Accordingly, the toolholder 31 can be preset in a gauge in the tool crib so that the toolholders on the machine tool 16 can be readily changed for a different set-up with a minimum of down time. After the first gauge means 48 has been used to establish the first predetermined gauge length of the cutting tip 56 relative to the gauge block 54, the compression fitting 52 may be loosened and the first gauge rod 53 retracted completely inside the gauge bore 50 in the shank 38. This protects the gauge rod 53 against damage, for example, from a carelessly dropped wrench or the like.

The toolholder assembly 15 includes a second gauge means 58 to preset the predetermined distance of the shank axis 33 relative to the face 20 of the head stock 18 or relative to a point on the respective slide 25. This second gauge means 58 includes a surface defining a gauge bore 60 in the holder base 30. The outer end of this gauge bore 60 is threaded at 61 to receive a friction compression fitting 62 in turn receiving a second gauge rod 63. This gauge rod may be frictionally secured by the fitting 62 in any preset dimension to abut a second gauge block 64 affixed to the side of the slide 25. Alternatively it might abut the face 20 of the headstock 18 and by either of these two means the second gauge means 58 is able to preset a second predetermined distance between the axis 33 of the cylindrical shank and the headstock face 20. The gauge bore 60 is double ended in that it extends completely through the holder base 30. Both ends of this bore are threaded to alternatively receive the compression fitting 62. By this means the toolholder assembly 15 may be used on either the right side or the left side of the machine tool 16 and still the second gauge means will engage a gauge block on the headstock face side of the respective slide.

To secure the cylindrical toolholder shank 38 in the holder base in a manner to resist displacement and especially rotation thereof, key means is used. A keyway 67 is provided in the holder base and first and second keyways 68 and 69 are provided diammetrically opposed in the cylindrical shank 38. A key 70 fits into opposing parts of these keyways 67 and 68 or 67 and 69 depending upon the position of the shank 38. This permits the toolholder 31 to be positioned for up-cutting as shown in FIG. 2 as on the left side of the machine tool or positioned for downcutting as shown in FIG. 9 which would be suitable for the right side of the machine tool 16.

The cylindrical shank 38 has a second gauge bore 72 parallel to the axis 33 and displaced relative to this axis diametrically opposite from the gauge bore 50. This is an alternative position for the gauge rod 53 and may be utilized when the toolholder 31 is mounted upside-down for down cutting as would be the case for FIG. 9. In such condition the gauge rod 53 will be positioned closer to the mounting surface 26 for cooperation with the first gauge block 54.

A built-in coolant system is provided in the toolholder 31 and a longitudinally disposed coolant bore 74 is within the shank 38 and parallel to the axis 33. Two director channels 75 merge with this coolant bore at the front end of the shank 38 in order to provide a flood of coolant to the cutting tool 56. At the rear of the shank 38 a cross-bore 76 connects therewith and a quick disconnect coolant coupling 77 is threaded in the outer end of this cross bore 76. A pipe plug 78 plugs the other end of this cross-bore and is readily interchangeable with the coupling 77 for coolant flow to the tool from whichever side of the tool-holder 31 is most convenient. This is especially useful when the toolholder assembly 15 is used alternately on right and left sides of the machine tool 16.

An adjusting screw 80 is received within a cross-bore 81 in the holder base 30 and co-acts with the cross-slide 25 in order to provide precise adjustment of this holder base 30 relative to the cross-slide. This permits easy and precise movements of the cross-slide in order to use the second gauge means 58 and prior to the hold down bolts 42 being tightened. A cover 84 contains a slot 85 parallel to the axis 33 and a screw 86 passing through the slot 85 fastens this cover 84 to the cap 39. By loosening the screw 86, the cover 84 may be slid to one side to reveal the hold down bolts 42 and the clamping screws 36 at that end of the holder base 30. When all the screws and bolts are tightened, the cover may be returned to its central position and the screw 86 tightened to prevent chips getting into the socket heads of these screws 86 and these bolts 42.

Figure 7:
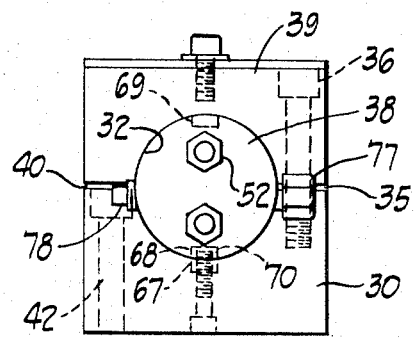
FIG. 7 is an end view of a toolholder assembly.
Figure 8:
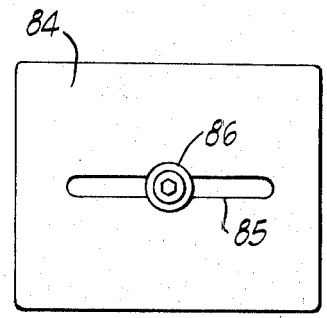
FIG. 8 is a top view of the cover for the toolholder assembly.

FIG. 7 shows a straight key 70 whereas FIGS. 14 and 15 show a special off-set key 90. By simply changing from the straight key 70 to the off-set key 90, one may obtain an off-set of the cutting tool relative to a perpendicular to the spindle axis. This will give side clearance of the tool, for example, 2° relative to a perpendicular face or shoulder on the workpiece. The off-set key 90 is easily reversible end for end and thus this single key will establish either off-set to the right or off-set to the left relative to a perpendicular to the spindle axis for use on toolholders on the right or left side of the machine tool 16.

Figure 4:
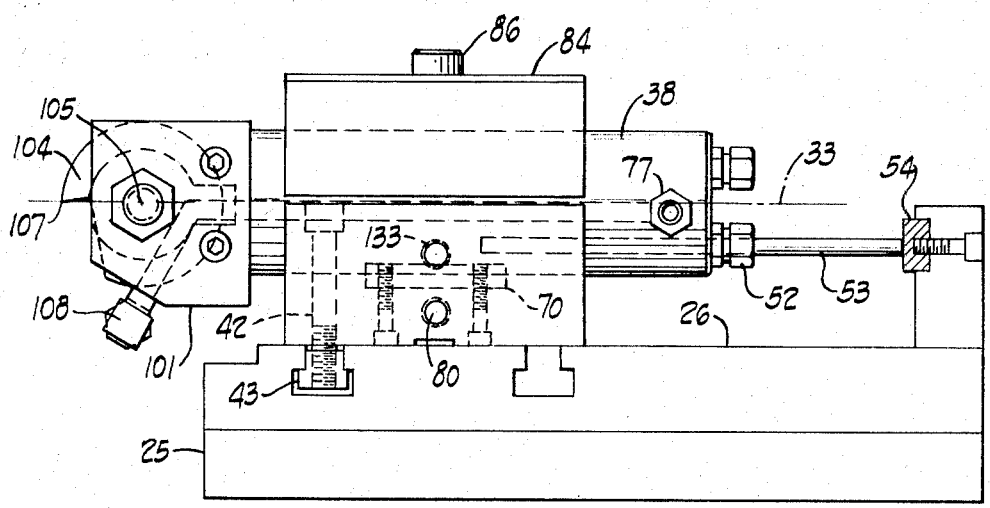
FIG. 4 is a side elevational view of another slide and toolholder assembly according to the invention.

FIG. 14 shows a still further modification with two adjusting screws 132 and 133 threaded into opposing apertures in the holder block 30 to engage pockets 134 milled into the central part of the shank 38 below the shank axis 33. If the key 90 or 70 is removed, then adjustment of these screws 132 and 133 will permit rotationally tilting the toolholder shank 38 and thus this may be an alternate method of providing tool off-set relative to a plane perpendicular to the spindle axis. Two additional pockets 134 are milled on the upper half of the shank 38 for cooperation with the screws 132 and 133 if the toolholder shank is inverted. FIG. 4 shows the longitudinal central location of such adjusting screw 133.

All of the foregoing parts are standard for the toolholder assembly 15 and such toolholder assembly may be used in any one of the six cross-slide positions of the machine tool 16. Where the machine tool has been manufactured with uniform dimensions of all slide mounting surfaces 26 relative to the cutting plane, then the toolholder assembly 15 may be used directly on the mounting of any of these surfaces 26. Where this mounting dimension varies on some machine tools, a simple filler plate may be positioned between the two mounting surfaces 26 and 34. By this means it will be seen that a single toolholder assembly 15 has been created for any one of the cross-slides, for either right or left-side of the machine tool 16 and for either straight or off-set cutting on either side of the machine tool.

The toolholder assembly 15 further includes appropriate tool mounting means 46 on the front of the shank 38, and this may be any one of various tools, such as dovetail, circular, flat, cut-off, shaving, knurling, burnishing, stenciling and single roll threading tools. FIG. 2 shows a dovetail tool mount 92 on the front of the shank 38. This dovetail tool mount 92 includes a dovetail tool clamp 93 held by a screw 94 to clamp a dovetail tool 57. A stop block 95 is secured to the bottom of the dovetail tool mount 92 by a screw 96. An adjusting screw 97 is provided in the forward end of the stop block 95 and abuts the lower end of the dovetail tool 57. When the clamp screw 94 is loosened, the adjusting screw 97 may be rotated to adjust the position of the cutting tip 56 to be on the cutting plane; namely, on the axis 33. To aid this adjustment, the upper surface 98 of the dovetail mount 92 may be a gauge surface by being ground as a flat planar surface. Therefore, a flat gauge block may be placed on this planar surface 98 and the tool 57 adjusted by screw 97 until the cutting tip 56 is in engagement with this gauge block. The clamp screw 94 may then be tightened to hold the tool 57 in this position.

Figure 5:
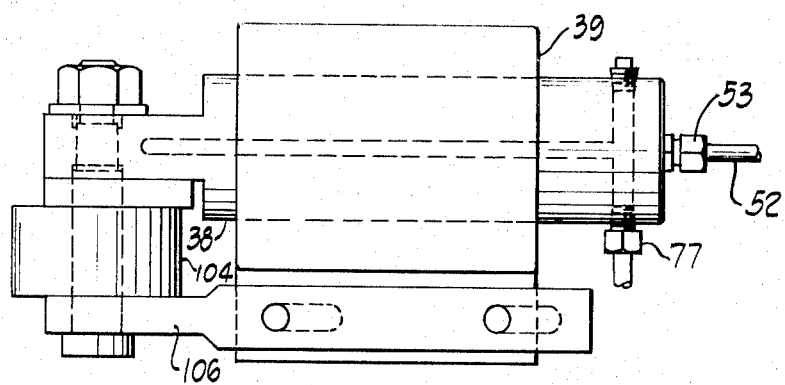
FIG. 5 is a top view of the slide and toolholder assembly of FIG. 4.

FIGS. 4 and 5 show an alternative tool mounting 101 which is a circular tool mount on the front of the shank 38. This circular tool mount 101 includes a bore 102 receiving a cross-shaft 103 on which a circular tool 104 is mounted. The axis 105 of this cross-shaft 103 is preferably displaced from the cutting plane by a small amount, for example, one-eighth of an inch which helps to provide front clearance for the cutting tool 104. A ratchet mechanism may be provided between the cutting tool 104 and the tool mount 101 in order to hold the circular tool 104 in progressive rotational positions as the tool 104 is reground to be resharpened.

Figure 6:
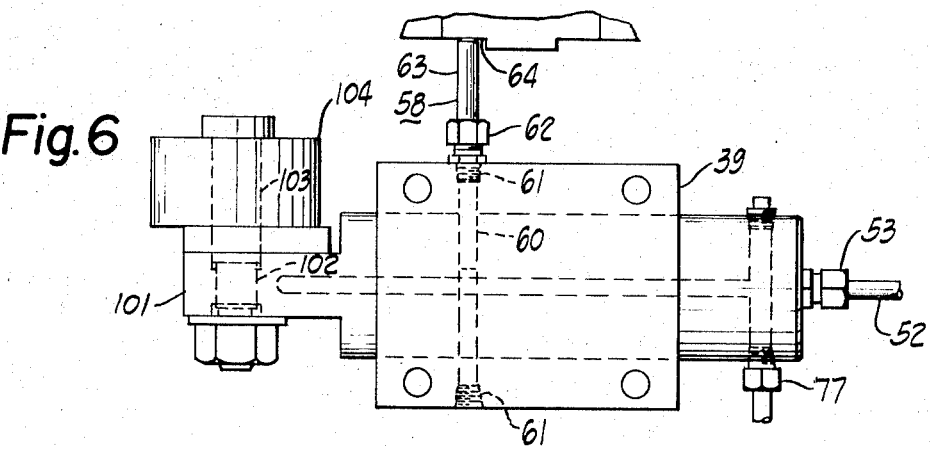
FIG. 6 is an alternative arrangement for the toolholder assembly of FIG. 5.

FIG. 6 shows that the circular cutting tool 104 may be placed on the inside of the shank and FIG. 5 shows an alternative disposition with the cutting tool 104 on the outside of the shank 38. An outboard support bearing 106, as shown in FIG. 5, may be used to support the outer end of the cross-shaft 103 for greater tool rigidity. This outboard support may be used in FIG. 6 as well, if desired. A coolant nozzle 108 is secured in the front of the coolant bore 74 and may be swiveled to direct coolant to the cutting tip 107.

FIGS. 9 and 10 show the toolholder as incorporating a flat tool mount 110 on the front of the shank 38. The flat tool mount 110 has an enlarged head 111 with complementary recesses 112 on opposite sides thereof. Tightening screws 113 are received in threaded apertures 114 in the bottom wall of these recesses 112. The upper wall of the recess 112 is a tapering wedge wall 115 to engage a tapering wedge 116. This tapering wedge 116 engages the upper surface of a flat tool 117 of the lathe type. A hardened filler plate 118 is disposed between the tightening screws 113 and the tool 117. An adjusting screw 120 threaded in the rear of the shank 38 abuts a push rod 124 in turn abutting the rear of the flat tool 117. This not only helps to adjust the lengthwise position of this tool 117, but also absorbs the thrust of the tool relative to the workpiece. By longitudinally moving the wedge 116 and rotating the screws 113, the cutting tip 119 of the tool 117 may be adjusted to lie on the axis 33 of the shank 38. The tool 117 may be in either of the recesses 112.

FIGS. 11, 12 and 13 shows a cut-off tool mount 121 on the front of a shank 38. This cut-off tool mount 121 is generally similar to the flat tool mount 110 of FIGS. 9 and 10. Recesses 122 are provided on opposite sides of the tool mount 121 with the tightening screws 113 engaging an insert 123. The upper wall of the recesses 122 is a tapering wedge wall 125 to engage a wedge 126. The wedge 126 engages the top of the insert 123. This insert has a pocket 127 to receive a flat blade type cut-off tool 128. A cap 129 is secured by a screw 130 to fasten the cut-off blade 128 in this pocket 127. Again by adjusting the wedge 126 and tightening screws 113, the cutting tip of this tool 128 may be adjusted to line on the shank axis 33. The insert 123 is reversible end for end and this will permit the cut-off tool 128 to be on either side of this insert. Also the insert may be placed in one or both of the recesses 122. This permits this cut-off tool 128 to be at any one of four possible locations relative to the longitudinal length of the workpiece. Also one, two or even more of these cut-off tools may be used in a single tool mount 121 in case it is desired to cut grooves or the like in the workpiece.

In every case it will be noted that the coolant flow is above the cutting plane to flood coolant onto the cutting tool tip. This cutting tool tip is always adjustable into the cutting plane which is a reference plane containing the shank axis 33 and parallel to the mounting surface 26. This is a uniform dimension in all of these toolholder assemblies, for example, two inches.

The tool holder assembly 15 is simply constructed requiring a minimum of ground surfaces. The mounting surface 34 may be ground for proper reception on the mounting surface 26. The cylindrical shank 38 may be ground to be concentric with the axis 33 so that the cutting tool tip 56 will always lie in the cutting plane despite its longitudinal position relative to the holder base 30.

The present disclosure includes that contained in the appended claims, as well as that of the foregoing description. Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A toolholder assembly for a machine tool having a spindle with an axis and a slide movable relative to said axis and the slide having a mounting surface,
said toolholder assembly including, in combination,
a holder base,
means to secure said holder base to the slide mounting surface,
said holder base having a cylindrical first bore with an axis in a reference plane passing through the axis of the spindle and parallel to the slide mounting surface,
a cylindrical shank tool holder fitting within said cylindrical first bore and having a forward and a rearward end,
tool mounting means unitary with said forward end of said toolholder shank to hold a tool for operating on a workpiece in the spindle,
a first keyway in said holder base,
a second keyway in said cylindrical shank,
first gauge means to establish a first predetermined length between the cutting tip of the tool carried in said mounting means and a point on the slide,
and key means acting between said keyways to establish a tool in said mounting means perpendicular to or slightly off-set to the axis of the spindle.

2. A toolholder assembly as set forth in claim 1, including said ky means fitting into said keyways in alternative positions to establish a tool offset on either side of a perpendicular to the spindle axis.

3. A toolholder assembly as set forth in claim 2, wherein said key means is reversible to effect the different tool offsets.

4. A toolholder assembly as set forth in claim 2, including a key in said key means reversible end for end to effect the different tool offsets.

5. A toolholder assembly as set forth in claim 2, including a key with an unsymmetrical cross-section reversible end for end to effect the different tool offsets.

6. A toolholder assembly as set forth in claim 5, wherein said unsymmetrical key is off-set approximately 2° to permit the key to be reversed end for end and thus establish side clearance for a tool in the tool mounting for a slide position on either side of the machine tool spindle.

7. A toolholder assembly as set forth in claim 2, including two keyways in one of said shank and said holder base with said two keyways being diametrically opposed.

8. A toolholder assembly as set forth in claim 1, including means mounting said first gauge means on said rear end of said shank,
said first gauge means comprising a tapped hole in said shank parallel to the axis thereof,
and means including threaded means in said tapped hole and co-acting with said slide to establish said first pre-determined gauge length.

9. A toolholder assembly as set forth in claim 1, including first and second bores in said shank parallel to the axis thereof,
a tapped hole in the outer end of each said shank bore,
a friction compression fitting threadable in either of said tapped holes,
a first gauge block secured on the rear of the slide,
and a first gauge rod slidably securable alternatively in either of said first and second bores by said compression fitting to establish said first predetermined gauge length between the end of said first gauge rod engaging said first gauge block and the cutting tip of the tool carried in said tool mounting,
said first gauge rod being alternatively disposed in said first or said second bore depending upon the mounting of said cylindrical shank in the said holder base in either of two positions approximately 180° apart depending on whether the toolholder mounting is positioned for up-cutting or down-cutting.

10. A toolholder assembly as set forth in claim 9, wherein said first gauge rod may be received entirely within said shank bore when not in use as a gauge in order to protect said gauge rod.

11. A toolholder assembly as set forth in claim 1, including two longitudinal slots in said holder base substantially diametrically opposed relative to said shank axis to establish said holder base in two parts with one part being a cap removably secured to the other part by clamping screws, said cap being completely removable and said toolholder shank being removable in a direction transverse to the axis thereof to permit said holder base to remain secured to the slide and to thus not destroy the preset gauge distance of said cylindrical shank toolholder relative to the spindle axis.

12. A toolholder assembly as set forth in claim 1, including second gauge means acting between said holder base and said slide to establish a second predetermined gauge distance between the axis of said cylindrical shank and a point on the slide.

13. A toolholder assembly as set forth in claim 12, including a gauge bore in said holding base extending in a plane perpendicular to said shank, a threaded aperture in the outer end of said gauge bore, and means including threaded means in said threaded aperture and coacting with the slide to establish said second predetermined gauge distance.

14. A toolholder assembly as set forth in claim 13, including a second gauge block secured on the slide, a friction compression fitting threaded in said threaded aperture, a second gauge rod slidably securable in said gauge bore by said compression fitting to establish said second pre-determined gauge distance between the end of said second gauge rod engaging said second gauge block and the axis of said cylindrical shank.

15. A toolholder assembly as set forth in claim 14, including said gauge bore extending through said holder base, and a threaded aperture in the two outer ends of said gauge bore to alternatively receive said friction compression fitting for alternative disposition of said second gauge rod depending upon alternative dispositions of the holder base on the slide.

16. A toolholder assembly as set forth in claim 1, including a dovetail tool mounting means on the forward end of said cylindrical shank, a ground planar surface on said front end of said mounting means containing the axis of said cylindrical shank to enable a flat gauge block to lie in contact with said ground planar surface and a tip of a cutting tool in the dovetail mount to establish the proper position of the tool on the axis of said cylindrical shank.

17. A toolholder assembly as set forth in claim 16, including a stop block fastened on the bottom of said tool mounting means, and an adjusting screw threaded in a threaded aperture in said stop block to adjustably engage the bottom of a dovetail tool in said tool mounting means.

18. A toolholder assembly as set forth in claim 1, including a cut-off toolholder mounted on said tool mounting means including first and second recesses on opposite sides of the front end of said toolholder mount, each of said recesses adapted to receive an insert, tapped apertures in the bottom of said toolholder mounting means and extending to each of said recesses, tightening screws in said tapped apertures extending into said recesses, a tapering wedge wall on the upper surface of each said recess, a wedge engaging said tapering wedge wall and engaging a surface of said insert, said insert being positioned between said wedge and the inner ends of said tightening screws, said insert having a pocket on one side thereof to receive a flat thin cut-off tool, a cap secured to said insert to retain said cut-off tool in said pocket, the said tightening screws and the position of said wedge being movable to adjust the cutting tip of said cut-off tool on said axis of said cylindrical shank, said insert being symmetrical to be reversed end for end for two different positions of said cut-off tool relative to said cylindrical shank axis for a particular recess and being positionable in either recess for a total of four positions of said cut-off tool relative to said cylindrical shank axis.

19. A toolholder assembly as set forth in claim 1, including a cross-shaft on the front of said tool mounting means having an axis in a plane perpendicular to said shank axis, and a circular cutting tool mounted on said cross-shaft.

20. A toolholder assembly as set forth in claim 1, including a flat toolholder mount on said toolholder mounting means including first and second recesses on opposite sides of the front end of said toolholder mount, each of said recesses adapted to receive a flat tool of the lathe type, tapped apertures in the bottom of said toolholder mounting means and extending to each of said recesses, tightening screws in said tapped apertures extending into said recesses, a tapering wedge wall on the upper surface of each said recess, a wedge engaging said tapering wedge wall and engaging a surface of a flat tool which is positioned between said wedge and the inner ends of said tightening screws to adjust the cutting tip of said tool on said axis of said cylindrical shank.

21. In combination with a machine having a spindle and a slide with a mounting surface, the provision of, a holder base, means to secure said holder base to said slide, said holder base having a cylindrical bore with an axis in a reference plane passing through the axis of said spindle and parallel to said slide mounting surface, a cylindrical shank tool holder fitting within said cylindrical bore and having a forward and a rearward end, toolholder mounting means unitary with said forward end of said toolholder shank and first gauge means on said rear end of said cylindrical shank, said first gauge means comprising a second bore in said shank parallel to the axis thereof, a tapped hole in said bore, a friction compression fitting threaded in said tapped hole, and a gauge rod slidably securable in said second bore by said compression fitting and co-acting with the slide to establish a first predetermined gauge length between the cutting tip of the tool carried in said tool mounting and a point on the slide.

* * * * *